(No Model.)

O. R. MORRIS.
Grain and Seed Sieve.

No. 238,800.  Patented March 15, 1881.

Witnesses:
H. A. Hall
J. P. Theo. Lang

Inventor:
Oscar R. Morris
by his atty,
Marcus Penwick & Lawrence

N. PETERS, PHOTO-LITHOGRAPHER, WASHINGTON, D. C.

UNITED STATES PATENT OFFICE.

OSCAR R. MORRIS, OF SALEM, INDIANA.

GRAIN AND SEED SIEVE.

SPECIFICATION forming part of Letters Patent No. 238,800, dated March 15, 1881.

Application filed January 11, 1881. (No model.)

*To all whom it may concern:*

Be it known that I, OSCAR R. MORRIS, a citizen of the United States, residing at Salem, in the county of Washington and State of Indiana, have invented a new and useful Improvement in Sieves to be Used for Cleaning Grain and Seed in Thrashing-Machines; and I do hereby declare that the following is a full, clear, and exact description thereof, reference being had to the accompanying drawings, forming a part of this specification, and the letters of reference marked thereon, in which drawings—

Figure 1:
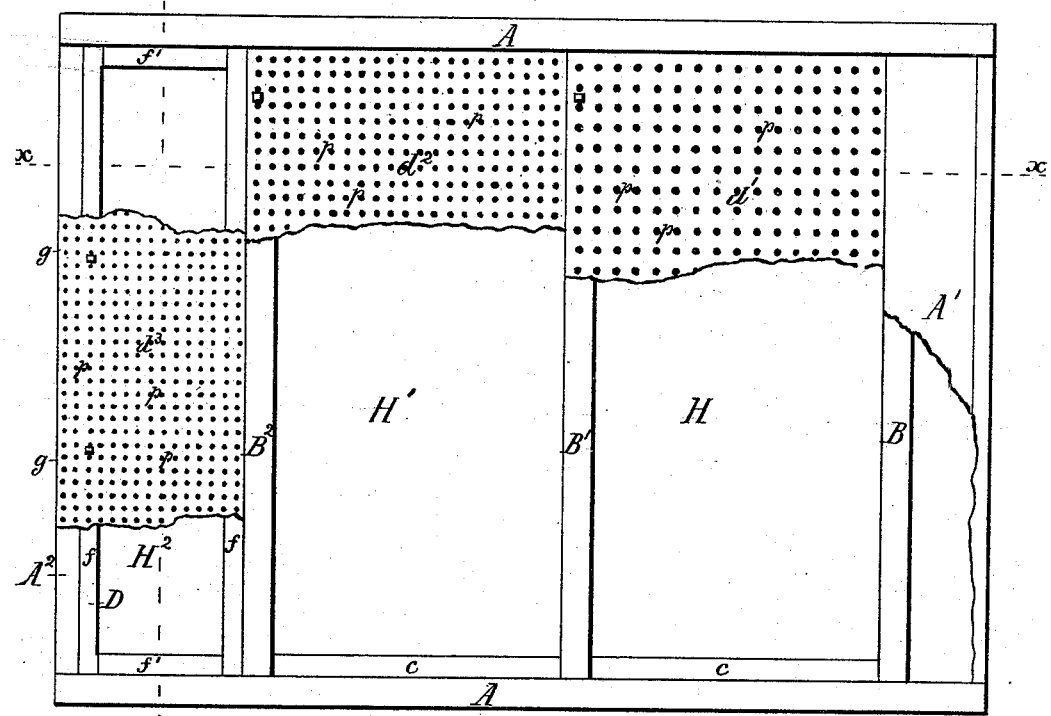
Figure 2:
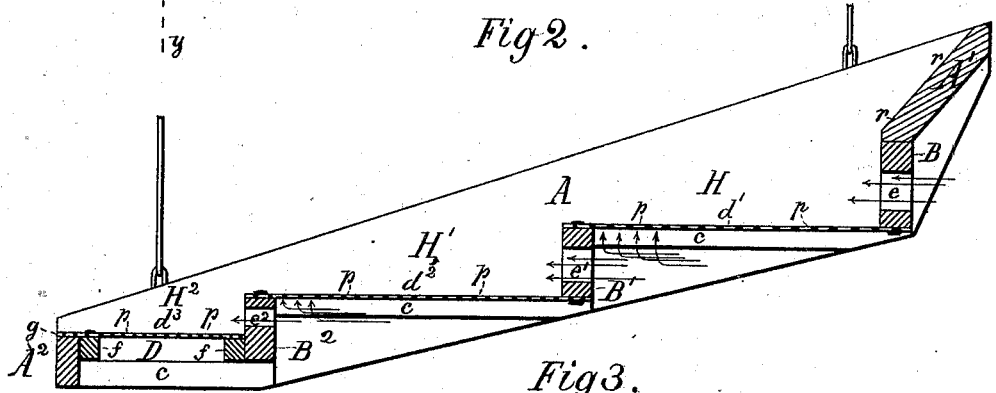
Figure 3:
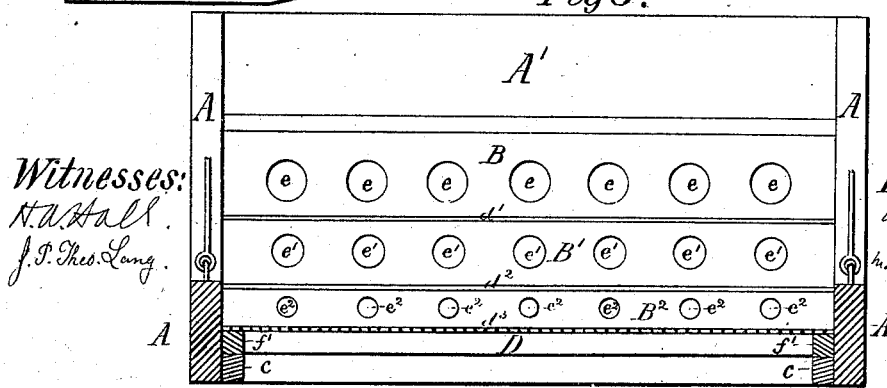

Figure 1 is a plan view of my improved sieve. Fig. 2 is a longitudinal section in the line $x\ x$ of Fig. 1; and Fig. 3 is a front elevation and a cross-section, in the line $y\ y$ of Fig. 1, of my improved sieve.

Throughout the figures like letters indicate the same parts.

The object of my invention is the production of an improved sieve for use in connection with thrashing-machines, whereby grain and other seed may be more perfectly separated from chaff, small sticks, and trash during the simultaneous acts of thrashing and cleaning the same than has heretofore been accomplished by the use of sieves for such purpose as ordinarily constructed. This object I attain by the mechanism shown in the accompanying drawings, in which—

A indicates the longitudinal side pieces of the sieve; A', a sloping cross-piece at the head of the sieve, and $A^2$ a cross-piece at the foot of the same, said side, head, and foot pieces being framed together in any proper manner and constituting the frame or "shoe" of the sieve.

B, B', and $B^2$ are transverse steps applied between the longitudinal side pieces, A A, and supported by cleats $c$ beneath, which are attached to the inside surface of the side pieces, as shown. These transverse steps divide the sieve into three sections—to wit, an upper section, H, a middle section, H', and a lower end section, $H^2$, which, in capacity, is about one-half less than that of H and H'.

In section H $d'$ is a sheet-metal sieve-plate having perforations $p$ throughout the same, as represented in Figs. 1 and 2; and $d^2$ and $d^3$ are also like perforated plates within their respective sections H' and $H^2$. The perforated plate $d'$ has its rear end secured to the under surface of the step B, while its front end is secured upon the upper surface of the step B', as shown; and in like manner the sieve-plate $d^2$ has its rear end secured to the under surface of the step B', while its front end is secured upon the upper surface of the step $B^2$. The sieve-plate $d^3$ is secured upon a frame, D, composed of side pieces, $f$, and end pieces, $f'$, which frame, when in place as shown in the figures, is supported upon the cleats $c$ of the lower section, $H^2$. The forward portion of the sieve-plate $d^3$ is extended as indicated at $g$, so as to overlap the upper surface of the cross-piece $A^2$ of the frame of the sieve, thereby forming a continuous face to the metal plate $d^3$, between the step $B^2$ and the outer lower extremity of the sieve.

In practice the section $H^2$ is located over the waste-pipe of the thrashing-machine in which my improved sieve may be used, and I therefore apply the sieve-plate $d^3$ to a frame, D, as shown, which is removable from said section when it is desirable to substitute either a rake in its place or a like frame with a sieve-plate having perforations of either greater or less diameter, as may be needed during the operation of the sieve.

In operation the thrashed grain or seed, intermingled with chaff, small sticks, and trash, is fed into the sieve along over the inclined surface $r$ of the cross-piece A' at the head of the sieve. It thence falls down the step B and upon the sieve-plate $d'$, and during its fall is subjected to a blast of air from the fan of the thrashing-machine through a series of air-holes, $e$, in the step B, (clearly shown in Figs. 2 and 3.) These holes are made central of the depth or rise of the step, and are spaced apart longitudinally thereof, so that the blast of air shall operate upon the whole volume of grain and trash passing down from the inclined surface $r$ of the cross-piece A, while at the same time a portion of the blast passes up through the perforations $p$ of the sieve-plate $d'$, thus raising the trash from contact with the plate, thereby co-operating with the effect of the blast through the step B. Similar air-holes, but of less diameter than the air-holes $e$ of the step B, are provided in the succeeding steps B' and $B^2$, the air-holes $e$ being of the greatest capacity, the air-holes $e'$ of less capacity than $e$, and the air-holes $e^2$ of less capacity than $e'$.

In this manner I graduate the blast of air over the perforated plates $d'$ $d^2$ $d^3$ in a direction longitudinally of the sieve, the greatest volume of air being applied to the moving grain and trash during their passage through the section H of the sieve, where it is most needed to effect the initial separation of the grain or seed from the chaff and trash. As the grain which has not fallen through the plate $d'$ and remaining trash pass off from the plate $d'$ and fall down the step B' onto the plate $d^2$ they are in like manner subjected to a blast of air through the air-holes $e'$ of the step B', and through the perforations $p$ in the plate $d^2$, and as a partial separation of the grain and trash has already been effected in the section H, a lesser volume of air is now applied through the smaller holes $e'$ of the step B', and thus the blast diminishes in volume and power as the grain becomes separated from its trash and advances successively from sieve-plate $d'$ to $d^2$, and from $d^2$ to $d^3$. If the blast of air were of the same power or volume over plate $d^2$ as over plate $d'$ there would be a liability of forcing some of the grain off of the plate $d^2$ onto plate $d^3$ in section H which should have fallen through the perforations $p$ in plate $d^2$; but by making the air-holes $e'$ of less volume than $e$ the blast of air is graduated to the partially-cleansed and lighter condition of the grain upon the plate $d^2$ of section H'; and for the same reason the air-holes $e^2$ in step B$^2$ are of still less capacity. In other words, when the grain intermingled with chaff, small sticks, and trash falls into the section H a heavier blast of air is required, and may be used without liability of carrying along the more perfect and heavier grain than is required or could be used when the lighter portion of the grain partially divested of trash passes down the step B' onto the plate $d^2$, and so on.

By constructing the steps B B' B$^2$ with imperforated portions above, below, and between the perforations $e$ $e'$ $e^2$ the blast of air from the fan will be broken in rear of the steps B' B$^2$, (indicated by the arrows in Fig. 2,) and that portion of the blast which does not go through the perforations $e'$ $e^2$ will, by reaction, pass up through the perforations $p$ of such sieve-plate as may be in rear of a given step, and thereby facilitate the separation of the grain.

I have shown the sieve-plate $d^3$ of section H$^2$ mounted on a removable frame, D, for the purpose heretofore stated; and I contemplate, in some instances, to have the sieve-plates $d'$ $d^2$ similarly mounted upon removable frames, so that they may be readily substituted by other frames having sieve-plates with either greater or lesser perforations $p$, to suit the kind of grain or seed which I may desire to separate from its chaff and trash.

I claim—

1. A step-sieve having its steps provided with perforations of gradually-diminished diameters or capacity, substantially as and for the purpose described.

2. A step-sieve provided with perforations of gradually-diminished diameters or capacity through its steps, and having such perforations situated above and below its sieve-plates, whereby a graduated volume of air may be successively forced over the sieve-plates and up through the sieve-plates, substantially as and for the purpose described.

3. The combination of horizontal or nearly horizontal sieve-plates, vertical steps provided with perforations of gradually-diminished diameters or capacity, and an inclined sieve-frame, substantially as and for the purpose described.

Signed in presence of two subscribing witnesses.

OSCAR R. MORRIS.

Witnesses:
BEVERLY T. PACE,
FREDERICK N. BERKEY.